United States Patent [19]

Kadono et al.

[11] Patent Number: 5,532,322
[45] Date of Patent: Jul. 2, 1996

[54] PROCESS FOR PREPARING BROMINATED POLYSTYRENE

[75] Inventors: Shinichi Kadono; Kiyoshi Mishima; Akihisa Takahasi, all of Fukuyama; Akira Taniuchi, Kyoto, all of Japan

[73] Assignee: MANAC Inc., Fukuyama, Japan

[21] Appl. No.: 534,181

[22] Filed: Sep. 26, 1995

[51] Int. Cl.$^6$ ...................................................... C08F 8/22
[52] U.S. Cl. ............... 525/357; 525/333.3; 525/333.4; 525/359.1; 525/359.3; 525/360
[58] Field of Search ........................... 525/357, 359.1, 525/359.3, 360

[56] References Cited

U.S. PATENT DOCUMENTS 4,143,221  3/1979  Naarmann et al. ................. 525/333.4
4,879,353  11/1989  Sanders et al. ...................... 525/357
5,077,345  12/1991  Newman et al. .................... 525/333.4
5,235,000  8/1993  McKinnie ............................ 525/355

Primary Examiner—Bernard Lipman
Attorney, Agent, or Firm—Frishauf, Holtz, Goodman, Langer & Chick

[57] ABSTRACT

Disclosed is a process for preparing a brominated polystyrene, which comprises reacting a polystyrene dissolved or dispersed in a halogenated hydrocarbon type solvent, with a brominating agent in the presence of an antimony oxide catalyst.

12 Claims, No Drawings

PROCESS FOR PREPARING BROMINATED POLYSTYRENE

BACKGROUND OF THE INVENTION

This invention relates to a process for preparing a brominated polystyrene which is useful as a flame-retardant for a synthetic resin.

A brominated polystyrene has been used as a flame-retardant for various synthetic resins represented by engineering plastics such as a saturated polyester and a polyamide. These resins into which a flame-retardant is formulated have been used in various fields such as electric and electronic fields where flame retardance is required.

Various processes for preparing a brominated polystyrene have been proposed. For example, there have been proposed a process for preparing a brominated polystyrene by reacting a polystyrene having a weight average molecular weight of 20,000 or more with bromine chloride in an organic solvent under anhydrous conditions in the presence of a metal salt of a Lewis acid as a brominating catalyst at a temperature of about 50° C. or lower in Japanese Patent Publication No. 57684/1989 and a process for preparing a brominated polystyrene by brominating a polystyrene in the copresence of a dehydrating agent in aliphatic halogenated hydrocarbon as a solvent in the presence of a Lewis acid catalyst at 0° to 40° C. in Japanese Provisional Patent Publication No. 215807/1990. In either of these methods, a Lewis acid is used as a brominating catalyst so that it is required to carry out bromination under anhydrous conditions or at least under a condition that a water content in a reaction solvent is 0.02% or less. If the water content is more than 0.02%, the Lewis acid catalyst is decomposed so that bromination does not proceed as expected, whereby it is impossible to obtain a brominated polystyrene having a high bromine content and excellent heat resistance, which can be used as a flame-retardant. Further, the Lewis acid catalyst is decomposed even by water in the air so that sufficient control for storage is required. From the above points, conventional preparation processes were not satisfactory as an industrial preparation process.

SUMMARY OF THE INVENTION

An object of the present invention is to provide a brominated polystyrene which can solve the above problems and is excellent as a flame-retardant for a synthetic resin.

The present inventors have studied intensively in order to solve the above problems and consequently found that by using antimony oxide as a catalyst when a polystyrene is brominated, bromination proceeds even under hydrous conditions, and the resulting brominated polystyrene has excellent color tone and heat resistance and is useful as a flame-retardant for a synthetic resin, to accomplish the present invention.

That is, the present invention is a process for preparing a brominated polystyrene, which comprises reacting a polystyrene dissolved or dispersed in a halogenated hydrocarbon type solvent, with a brominating agent in the presence of an antimony oxide catalyst.

DESCRIPTION OF THE PREFERRED EMBODIMENTS

In the following, the present invention is explained in detail.

As the polystyrene to be provided for bromination of the present invention, there may be used a material containing at least 50% by weight or more, preferably 75% by weight or more of a styrene component as a monomer unit, such as a polystyrene, a styrene-maleic anhydride copolymer, a polyethylene-styrene graft copolymer, a styrene-butadiene copolymer, an acrylonitrile-styrene copolymer, an acrylonitrile-butadiene-styrene copolymer, a styrene-divinyl benzene crosslinked copolymer and a modified polyphenylene ether (an alloy of a polyphenylene ether and a polystyrene type resin). Particularly preferred are a polystyrene, a styrene-maleic anhydride copolymer, a polyethylene-styrene graft copolymer, a styrene-divinyl benzene crosslinked copolymer and a modified polyphenylene ether (an alloy of a polyphenylene ether and a polystyrene type resin). Also, there may be used foamed materials of the above resins and materials recovered from the above resins, for example, materials recovered from formed resins used as a wrapping material or a buffering material, from which foreign matters such as paper and an adhesive tape are removed.

As the halogenated hydrocarbon type solvent to be used in the present invention, there may be mentioned a chlorinated hydrocarbon such as methylene chloride, chloroform, carbon tetrachloride, ethylene dichloride, 1,1,1-trichloroethane, trichloroethylene, tetrachloroethylene and monochlorobenzene; and a brominated hydrocarbon such as methylene bromide and ethylene dibromide. Preferred are methylene chloride, chloroform, ethylene dichloride, methylene bromide and ethylene dibromide. The amount of the above solvent to be used in the reaction is preferably 3 to 50 times, particularly preferably 5 to 30 times of the weight of the starting polystyrene.

As the brominating agent to be used in the present invention, there may be used bromine or bromine chloride. Also, bromination can be carried out in the copresence of bromine and chlorine. However, in bromination carried out in the copresence of bromine and chlorine, it is necessary that a molar ratio of chlorine does not exceed a molar ratio of bromine. As the brominating agent, bromine chloride is particularly preferred, and it is also particularly preferred to carry out bromination in the copresence of bromine and chlorine. The amount of the brominating agent to be used varies depending on the kind of the brominating agent and a desired bromine content of a brominated polystyrene, but the brominating agent can be used generally in an amount of 0.5- to 20-fold weight, preferably 1- to 10-fold weight based on the weight of the polystyrene. As antimony oxide as a brominating catalyst, there may be used diantimony trioxide, diantimony tetraoxide and diantimony pentaoxide, preferably diantimony trioxide. The catalyst is added preferably in an amount of 1 to 30 parts by weight, more preferably 1 to 20 parts by weight based on 100 parts by weight of the polystyrene.

It is not necessary that a water content during bromination reaction is 0.02% or less based on the amount of the reaction solvent, i.e., substantially in an anhydrous state, as in the case of using a Lewis acid catalyst. The water content is preferably 0 to 5%, more preferably 0 to 2% based on the amount of the reaction solvent.

The bromination reaction of the present invention is carried out preferably at −20° C. to 100° C., more preferably −15° C. to 60° C. After completion of the reaction and aging, an excess brominating agent is reduced or neutralized, further washed with water and neutralized, then, a brominated polystyrene solution can be obtained. Then, a solid or powder of the brominated polystyrene can be obtained by a method of removing the reaction solvent by concentration from the brominated polystyrene solution, a method of adding the brominated polystyrene solution to a poor solvent such as methanol to precipite crystals, or a method of dispersing the brominated polystyrene solution in warm water by removing the reaction solvent by heating while adding the brominated polystyrene solution to warm water. Further, a brominated polystyrene product can be obtained by solid-liquid separation, drying and pulverization, if necessary.

The brominated polystyrene obtained by the process of the present invention can be formulated as a flame-retardant into various synthetic resins such as a thermoplastic resin, a thermosetting resin and a thermoplastic elastomer. When use of the brominated polystyrene obtained by the process of the present invention as a flame-retardant of a combustible resin is taken into consideration, the bromine content thereof is preferably 20 to 70% by weight. The amount of the brominated polystyrene to be formulated is 5 to 40 parts by weight based on 100 parts by weight of the resin. As an example of these resins, there may be mentioned a styrene type resin such as a polystyrene, a high impact polystyrene and an acrylonitrile-butadiene-styrene copolymer; a polyolefin such as a polyethylene and a polypropylene; a saturated polyester such as polyethylene terephthalate, polybutylene terephthalate, polyethylene naphthalate and polycyclohexanedimethylene terephthalate; a polyamide such as nylon 66, nylon 46 and a semi-aromatic nylon; a modified polyphenylene ether; a polycarbonate; and a polyarylate. These resins are used as a monopolymer, a copolymer or a mixture thereof.

EXAMPLES

The present invention is described in detail by referring to Examples, but the present invention is not limited by these Examples.

EXAMPLE 1

Into a 1 l-reactor made of glass (equipped with a stirring device, a condenser, a thermometer and a dropping funnel), 750 g of ethylene dichloride (water content: 0.002%) and 75 g of polystyrene DIAREX GP Polystyrene (trade name, produced by Mitsubishi Kasei Polytex) were charged and dissolved by stirring. Then, 11 g of diantimony trioxide was added to the solution, and to the mixture was added dropwise 720 g of a previously prepared bromine chloride solution (a 70% by weight solution in ethylene dichloride) from the dropping funnel over 2 hours while maintaining the reaction temperature to 10° to 25° C. After completion of the dropwise addition, by maintaining the inner temperature to 20° to 30° C., the mixture was aged for 1 hour. Gases generated during the reaction and the aging were absorved by water in a gas-absorbing device. After completion of the aging, the reaction mixture was washed with water and neutralized, and then the organic layer was added dropwise to 3 l of methanol to precipitate crystals. The crystals were filtered and dried to obtain 216 g of powder of a brominated polystyrene. As to the brominated polystyrene obtained, a bromine content, TG (thermogravimetric analysis), hue of appearance and an amount of HBr generated by heating were measured by the following methods. The analytical results are shown in Table 1.

Bromine content: measured by a method according to JIS K 7299 (flask combustion method).

TG (thermogravimetric analysis): measured at a temperature range from room temperature to 700° C. at a temperature-elevating rate of 10° C./min in air atmosphere by using a differential thermal analyzer (manufactured by Rigaku).

Hue of appearance: measured by a color difference meter type CR-100 (trade name, manufactured by Minolta Camera) to determine display system values of L, a and b.

Amount of HBr generated by heating: A heating pipe was set in an electric furnace and further connected to a gas-absorbing bottle (100 ml of distilled water) equipped with a blowing pipe. 3 g of a sample was charged into the heating pipe and heated at 200° C. for 1 hour by the electric furnace while passing a nitrogen gas (about 50 ml/min). The bromine content in gas-absorbing water was quantitated by the Volhard method.

EXAMPLE 2

Bromination and post-treatments were carried out in the same manner as in Example 1 except for using diantimony pentaoxide in place of diantimony trioxide to obtain 215 g of powder of a brominated polystyrene. The analytical results of the powder obtained are shown in Table 1.

EXAMPLE 3

In the same manner as in Example 1 except for using foamed polystyrene Aspack Sarasara (trade name, produced by Asahi Kasei Kogyo) for a cushioning material in place of polystyrene, ethylene dichloride and diantimony trioxide were added, and to the mixture was added dropwise 179 g of bromine from a dropping funnel and 86 g of chlorine from a chlorine cylinder over 2 hours while maintaining the reaction temperature at 10° to 25° C. After completion of the dropwise addition, by maintaining the inner temperature at 20° to 30° C., the mixture was aged for 1 hour. After completion of the aging, the reaction mixture was washed with water and neutralized. Then, while the organic layer was added dropwise to warm water, the solvent was removed to precipitate crystals in warm water. The crystals were filtered and dried to obtain 224 g of powder of a brominated polystyrene. The analytical results of the powder obtained are shown in Table 1.

EXAMPLE 4

Bromination and post-treatments were carried out in the same manner as in Example 1 except for using 750 g of ethylene dichloride having a water content of 1.0% in place of 750 g of ethylene dichloride having a water content of 0.002% to obtain 206 g of powder of a brominated polystyrene. The analytical results of the powder obtained are shown in Table 1.

EXAMPLE 5

Bromination and post-treatments were carried out in the same manner as in Example 1 except for using a product recovered from a foamed polystyrene having a molecular weight of 380,000 which had been used as a wrapping material, in place of polystyrene, using methylene chloride having a water content of 0.5% in place of ethylene dichloride having a water content of 0.002% and removing foreign matters by passing the resulting solution through a 200 mesh stainless steel net after stirring and dissolution and before bromination and post-treatments, to obtain 218 g of powder of a brominated polystyrene. The analytical results of the powder obtained are shown in Table 1.

Comparative Example 1

Bromination and post-treatments were carried out in the same manner as in Example 1 except for using no diantimony trioxide to obtain 136 g of powder of a brominated polystyrene. The analytical results of the powder obtained are shown in Table 1.

Comparative Example 2

Bromination and post-treatments were carried out in the same manner as in Example 1 except for using antimony trichloride in place of diantimony trioxide and using 750 g of ethylene dichloride having a water content of 1.0% in place of 750 g of ethylene dichloride having a water content of 0.002% to obtain 148 g of powder of a brominated polystyrene. The analytical results of the powder obtained are shown in Table 1.

Comparative Example 3

Bromination and post-treatments were carried out in the same manner as in Example 1 except for using anhydrous aluminum chloride in place of diantimony trioxide and using 750 g of ethylene dichloride having a water content of 1.0 % in place of 750 g of ethylene dichloride having a water content of 0.002% to obtain 146 g of powder of a brominated polystyrene. The analytical results of the powder obtained are shown in Table 1.

tured by Rikua) at a setting temperature of 280° C. Immediately after the mixture was extruded from a nozzle metal mold provided at the end of the extruder, an extruded strand was cooled in water and pelletized by a pelletizer. The resulting pellets were dried at 120° C. for 24 hours and then molded by using an injection molding machine F85 (trade name, manufactured by CLOCKNER FERROMATIK DEFSMA) at a cylinder temperature of 240° to 265° C. and a metal mold temperature of 140° to 150° C. to obtain a test piece. As to the test piece obtained, physical property tests were conducted by the following methods. The test results are shown in Table 2.

Heat distortion temperature was measured by a method according to JIS K 7207.

Flexural strength was measured by a method according to JIS K 7203.

A combustion test was conducted by a method according to UL94 (1/16 inch).

Oxygen index was measured by a method according to JIS K 7201.

Example B 100 parts by weight of a nylon 66 resin Amilan CM3001N (trade name, produced by Toray), 30 parts by weight of the brominated polystyrene obtained in Example 5, 8 parts by weight of antimony trioxide ATOX-S (trade name, produced

TABLE 1

|  | Example 1 | Example 2 | Example 3 | Example 4 | Example 5 | Comparative example 1 | Comparative example 2 | Comparative example 3 |
|---|---|---|---|---|---|---|---|---|
| Starting polystyrene*[1] | GPPS | GPPS | Foamed | GPPS | Recovered | GPPS | GPPS | GPPS |
| Solvent*[2] | EDC | EDC | EDC | EDC | Methylene chloride | EDC | EDC | EDC |
| Water content of solvent (%)*[3] | 0.002 | 0.002 | 0.002 | 1.0 | 0.5 | 0.002 | 1.0 | 1.0 |
| Catalyst | $Sb_2O_3$ | $Sb_2O_5$ | $Sb_2O_3$ | $Sb_2O_3$ | $Sb_2O_3$ | — | $SbCl_3$ | $AlCl_3$ |
| TG temperature at which reduction by 5% by weight occurs (°C.) | 350 | 355 | 365 | 347 | 353 | 255 | 218 | 221 |
| TG temperature at which reduction by 50% by weight occurs (°C.) | 396 | 400 | 407 | 394 | 395 | 345 | 398 | 391 |
| Bromine content (%) | 67.9 | 66.5 | 66.9 | 64.2 | 65.8 | 50.8 | 50.7 | 51.5 |
| Hue of appearance (L value) | 95.0 | 94.5 | 94.8 | 93.2 | 94.3 | 83.9 | 84.1 | 82.5 |
| Amount of HBr generated by heating (%) | 0.01 | 0.01 | 0.02 | 0.05 | 0.03 | 2.72 | 1.98 | 2.51 |

*[1]) GPPS shows a GP polystyrene produced by Mitsubishi Kasei Polytex, Foamed shows a foamed polystyrene produced by Asahi Kasei Kogyo, and Recovered shows a product recovered from a foamed polystyrene having a molecular weight of 380,000 used as a wrapping material.
*[2]) EDC shows ethylene dichloride.
*[3]) % by weight based on solvent The brominated polystyrenes obtained in Examples 1 to 5 were formulated into a reinforced polyethylene terephthalate resin and a nylon 66 resin, and the mixtures were kneaded and pelletized. The pellets were dried and subjected to injection molding. The resulting molded products had excellent appearance, flame retardance and mechanical strength.

Example A 100 parts by weight of polyethylene terephthalate TR-4550BH (trade name, produced by Teijin), 15 parts by weight of the brominated polystyrene obtained in Example 1, 5 parts by weight of antimony trioxide ATOX-S (trade name, produced by Nihon Seiko), 50 parts by weight of glass fiber 3MA429-A (trade name, produced by Asahi Fiber Glass) were mixed. Then, the mixture was kneaded by a biaxial extruder RY-30- 30-VS3.7 (trade name, manufacby Nihon Seiko), 60 parts by weight of glass fiber 03MAFT-2A (trade name, produced by Asahi Fiber Glass) were mixed. Then, the mixture was kneaded by a biaxial extruder RY-30- 30-VS3.7 (trade name, manufactured by Rikua) at a setting temperature of 240° to 260° C. Immediately after the mixture was extruded from a nozzle metal mold provided at the end of the extruder, an extruded strand was cooled in water and pelletized by a pelletizer. The resulting pellets were dried at 80° C. for 5 hours in vacuum and then molded by using an injection molding machine F85 (trade name, manufactured by CLOCKNER FERROMATIK DEFSMA) at a cylinder temperature of 255° to 265° C. and a metal mold temperature of 100° C. to obtain a test piece. As to the test piece obtained, physical property tests were conducted by the same methods as in Example A. The test results are shown in Table 2.

TABLE 2

|  | Example A | Example B |
|---|---|---|
| Heat distortion temperature (°C.) | 236.5 | 242.5 |
| Flexural strength (kg/mm$^2$) | 19.1 | 20.6 |
| Flexural modulus (kg/mm$^2$) | 1074 | 928 |
| Combustion test | V-0 | V-0 |
| Oxygen index | 34.2 | 34.3 |

The process for preparing a brominated polystyrene of the present invention can be industrialized easily and has excellent economy. Further, the brominated polystyrene obtained by the process of the present invention has excellent heat resistance and hue of appearance so that said polystyrene is useful as a flame-retardant for a synthetic resin. A molded product obtained by formulating said flame-retardant is a product having excellent appearance, flame retardance and mechanical strength and therefore having a high commercial value.

We claim:

1. A process for preparing a brominated polystyrene, which comprises reacting a polystyrene dissolved or dispersed in a halogenated hydrocarbon type solvent, with a brominating agent in the presence of an antimony oxide catalyst.

2. The process according to claim 1, wherein said brominating agent is at least one selected from the group consisting of bromine and bromine chloride.

3. The process according to claim 1, wherein said antimony oxide catalyst is at least one selected from the group consisting of diantimony trioxide, diantimony tetraoxide and diantimony pentaoxide.

4. The process according to claim 1, wherein said catalyst is added in an amount of 1 to 30 parts by weight based on 100 parts by weight of the polystyrene.

5. The process according to claim 1, wherein the brominating reaction is carried out at −20° C. to 100° C.

6. The process according to claim 1, wherein the halogenated hydrocarbon type solvent is at least one selected from the group consisting of a chlorinated hydrocarbon solvent and a brominated hydrocarbon solvent.

7. The process according to claim 6, wherein the chlorinated hydrocarbon type solvent is at least one selected from the group consisting of methylene chloride, chloroform, carbon tetrachloride, ethylene dichloride, 1,1,1-trichloroethane, trichloroethylene, tetrachloroethylene and monochlorobenzene.

8. The process according to claim 6, wherein the brominated hydrocarbon type solvent is at least one selected from the group consisting of methylene bromide and ethylene dibromide.

9. The process according to claim 1, wherein the polystyrene is at least one selected from the group consisting of a material containing at least 50% by weight or more of a styrene component.

10. The process according to claim 9, wherein the polystyrene is at least one selected from the group consisting of a polystyrene, a styrene-maleic anhydride copolymer, a polyethylene-styrene graft copolymer, a styrene-butadiene copolymer, an acrylonitrile-styrene copolymer, an acrylonitrile-butadiene-styrene copolymer and a styrene-divinyl benzene crosslinked copolymer.

11. The process according to claim 1, wherein water is contained in a reaction mixture in an amount of 5% by weight or less based on the amount of the solvent.

12. The process according to claim 1, wherein water is contained in a reaction mixture in an amount of 2% by weight or less based on the amount of the solvent.

* * * * *

REEXAMINATION CERTIFICATE (3949th)

United States Patent [19]
Kadono et al.

[11] B1 5,532,322
[45] Certificate Issued Dec. 7, 1999

[54] PROCESS FOR PREPARING BROMINATED POLYSTYRENE

[75] Inventors: Shinichi Kadono; Kiyoshi Mishima; Akihisa Takahasi, all of Fukuyama; Akira Taniuchi, Kyoto, all of Japan

[73] Assignee: MANAC, Inc., Fukuyama, Japan

Reexamination Request:
No. 90/004,622, Apr. 11, 1997

Reexamination Certificate for:
Patent No.: 5,532,322
Issued: Jul. 2, 1996
Appl. No.: 08/534,181
Filed: Sep. 26, 1995

[51] Int. Cl.$^6$ ......................................................... C08F 8/22
[52] U.S. Cl. ................... 525/357; 525/333.3; 525/333.4; 525/359.1; 525/359.3; 525/360
[58] Field of Search ................................. 525/333.4, 355, 525/357

[56] References Cited

U.S. PATENT DOCUMENTS

| | | | |
|---|---|---|---|
| 4,074,032 | 2/1978 | Naarmann et al. | 526/44 |
| 4,200,703 | 4/1980 | Diebel et al. | 525/357 |
| 4,352,909 | 10/1982 | Barda et al. | 525/157 |

FOREIGN PATENT DOCUMENTS 953484   3/1964   United Kingdom.

*Primary Examiner*—Fred M. Teskin

[57] ABSTRACT

Disclosed is a process for preparing a brominated polystyrene, which comprises reacting a polystyrene dissolved or dispersed in a halogenated hydrocarbon type solvent, with a brominating agent in the presence of an antimony oxide catalyst.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 4 are cancelled.

Claim 1 is determined to be patentable as amended.

Claims 3 and 5–12, dependent on an amended claim, are determined to be patentable.

New claims 13–18 are added and determined to be patentable.

1. A process for preparing a brominated polystyrene, which comprises reacting a polystyrene dissolved or dispersed in a halogenated hydrocarbon type solvent, with *bromine chloride as* a brominating agent in the presence of *1 to 30 parts by weight of* an antimony oxide catalyst, *based on 100 parts by weight of the polystyrene.*

*13. The process according to claim 1 wherein water is contained in a reaction mixture in an amount greater than 0.02% up to an amount of 5% by weight based on the amount of solvent.*

*14. The process according to claim 1 wherein water is contained in a reaction mixture in an amount greater than 0.02% up to an amount of 2% by weight based on the amount of solvent.*

*15. The process according to claim 1 wherein said antimony oxide catalyst is diantimony trioxide ($Sb_2O_3$).*

*16. The process according to claim 1 wherein water is contained in a reaction mixture in an amount greater than 0.02% up to an amount of 5% by weight based on the amount of solvent and said antimony oxide catalyst is diantimony trioxide added in an amount of 1 to 30 parts by weight based on 100 parts by weight of the polystyrene.*

*17. The process according to claim 16 wherein said bromine chloride brominating agent is formed by reacting bromine and chlorine in situ.*

*18. The process according to claim 1 wherein said bromine chloride brominating agent is formed by reacting bromine and chlorine in situ.*

* * * * *